(12) United States Patent
Koyama (10) Patent No.: US 10,620,513 B2
(45) Date of Patent: Apr. 14, 2020

(54) PROJECTION TYPE DISPLAY APPARATUS

(71) Applicant: CANON KABUSHIKI KAISHA, Tokyo (JP)

(72) Inventor: Takehiro Koyama, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/387,911

(22) Filed: Apr. 18, 2019

(65) Prior Publication Data
US 2019/0331987 A1 Oct. 31, 2019

(30) Foreign Application Priority Data

Apr. 26, 2018 (JP) .................................. 2018-084874
Mar. 25, 2019 (JP) .................................. 2019-056558

(51) Int. Cl.
*G03B 21/14* (2006.01)
*G03B 21/20* (2006.01)
*G03B 21/00* (2006.01)

(52) U.S. Cl.
CPC ......... *G03B 21/145* (2013.01); *G03B 21/204* (2013.01); *G03B 21/006* (2013.01); *G03B 21/2073* (2013.01)

(58) Field of Classification Search
CPC .... G03B 21/14; G03B 21/145; G03B 21/006; G03B 21/2073; G03B 21/204

USPC ......................................................... 353/119
See application file for complete search history.

(56) References Cited

U.S. PATENT DOCUMENTS

| | | | |
|---|---|---|---|
| 2005/0018151 A1* | 1/2005 | Kitabayashi | G02B 27/1013 353/119 |
| 2006/0033891 A1* | 2/2006 | Engle | G03B 21/10 353/119 |
| 2015/0212398 A1* | 7/2015 | Lam | G03B 21/145 353/119 |

FOREIGN PATENT DOCUMENTS

JP 3858488 B2 12/2006

* cited by examiner

*Primary Examiner* — William C. Dowling
(74) *Attorney, Agent, or Firm* — Carter, DeLuca & Farrell LLP (57) ABSTRACT

A projection type display apparatus includes a container configured to house a light source unit, a light modulation element, and an optical system configured to illuminate the light modulation element with light from the light source unit, a housing configured to house the container, and a reinforcement member configured to extend from an outer surface of the container to an inner surface of the housing and to contact the outer surface of the container and the inner surface of the housing. A side of the reinforcement member contacting the inner surface of the housing is fixed onto a side surface of the housing.

11 Claims, 12 Drawing Sheets

PROJECTION TYPE DISPLAY APPARATUS

BACKGROUND OF THE INVENTION

Field of the Invention

The present invention relates to a projection (type) display apparatus.

Description of the Related Art

A so-called motion projector has recently been increasingly installed in a simulation apparatus for amusement and aircraft simulator applications. A high pixel configuration and high image quality for the projector are promoted and a high image quality projector is likely to be selected in order to pursue the image reality even in the motion projector. Under such circumstances, the projector is required to have a structure that does not affect the image quality even when the operational vibrations of the simulator device or the environmental vibrations of the installation location. For example, Japanese Patent No. 3858488 discloses a motion projector.

However, according to the configuration disclosed in Japanese Patent No. 3858488, as the projector becomes brighter, the projector housing becomes larger and heavier so as to cool each component and the like. As the projector becomes heavier, the acceleration applied to the housing increases and the vibrational influence on the motion projector increases. Further, when the component inside the projector is enclosed by a box-shaped housing member, the housing may resonate at an operational frequency of the simulator device, and cause image blurs or the like.

As the housing member is simply thickened, the projector becomes heavier and the acceleration applied to the housing further increases. As a result, the projected image may blur and the image quality is deteriorated.

SUMMARY OF THE INVENTION

The present invention provides a compact, lightweight, and high image quality projection type display apparatus.

A projection type display apparatus according to one aspect of the present invention includes a container configured to house a light source unit, a light modulation element, and an optical system configured to illuminate the light modulation element with light from the light source unit, a housing configured to house the container, and a reinforcement member configured to extend from an outer surface of the container to an inner surface of the housing and to contact the outer surface of the container and the inner surface of the housing. A side of the reinforcement member contacting the inner surface of the housing is fixed onto a side surface of the housing.

Further features of the present invention will become apparent from the following description of exemplary embodiments with reference to the attached drawings.

DESCRIPTION OF THE EMBODIMENTS

Referring now to the accompanying drawings, a detailed description will be given of embodiments according to the present invention.

First Embodiment

Figure 1:
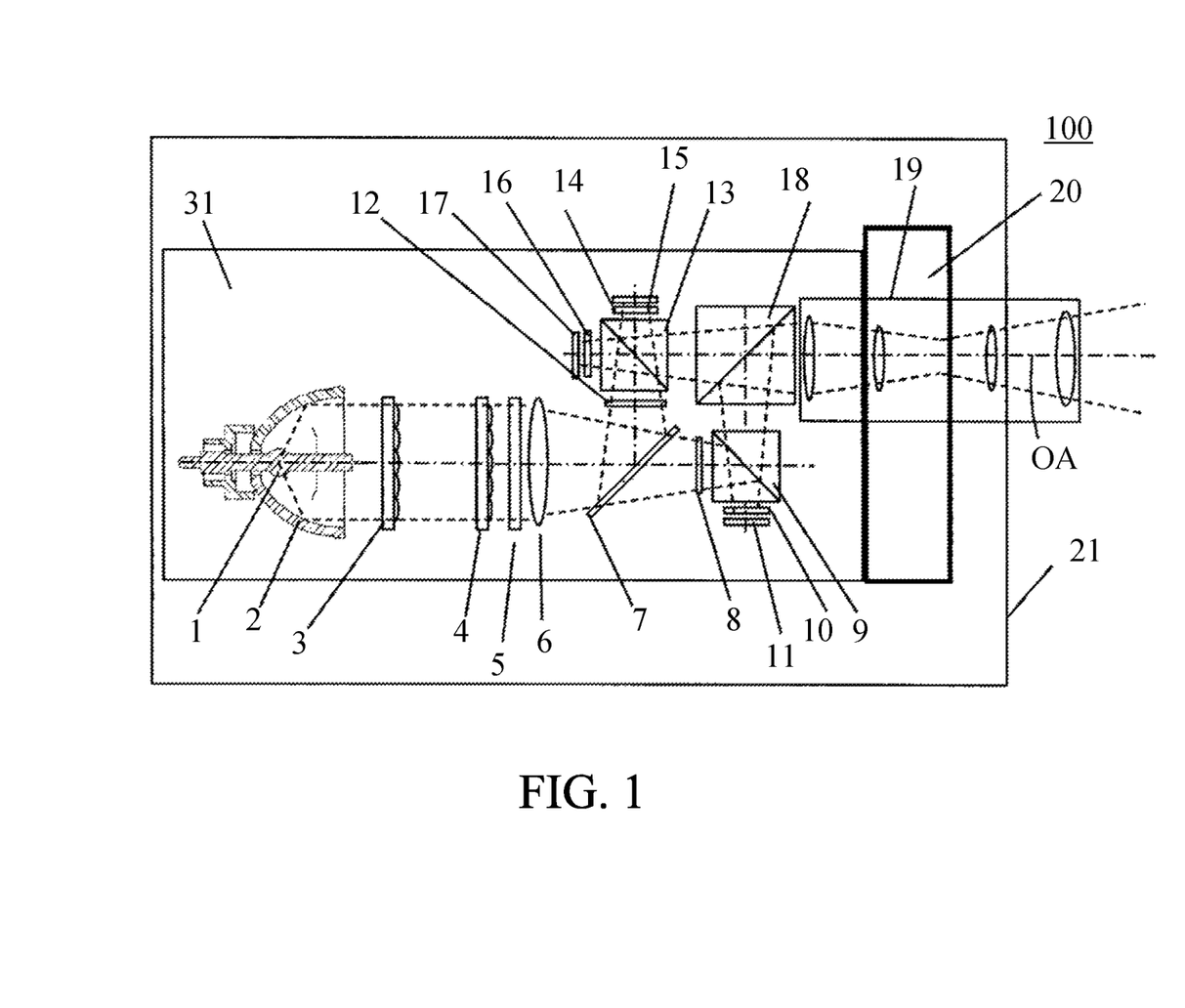
FIG. 1 is a side view of a projection type display apparatus according to each embodiment.
Figure 2:
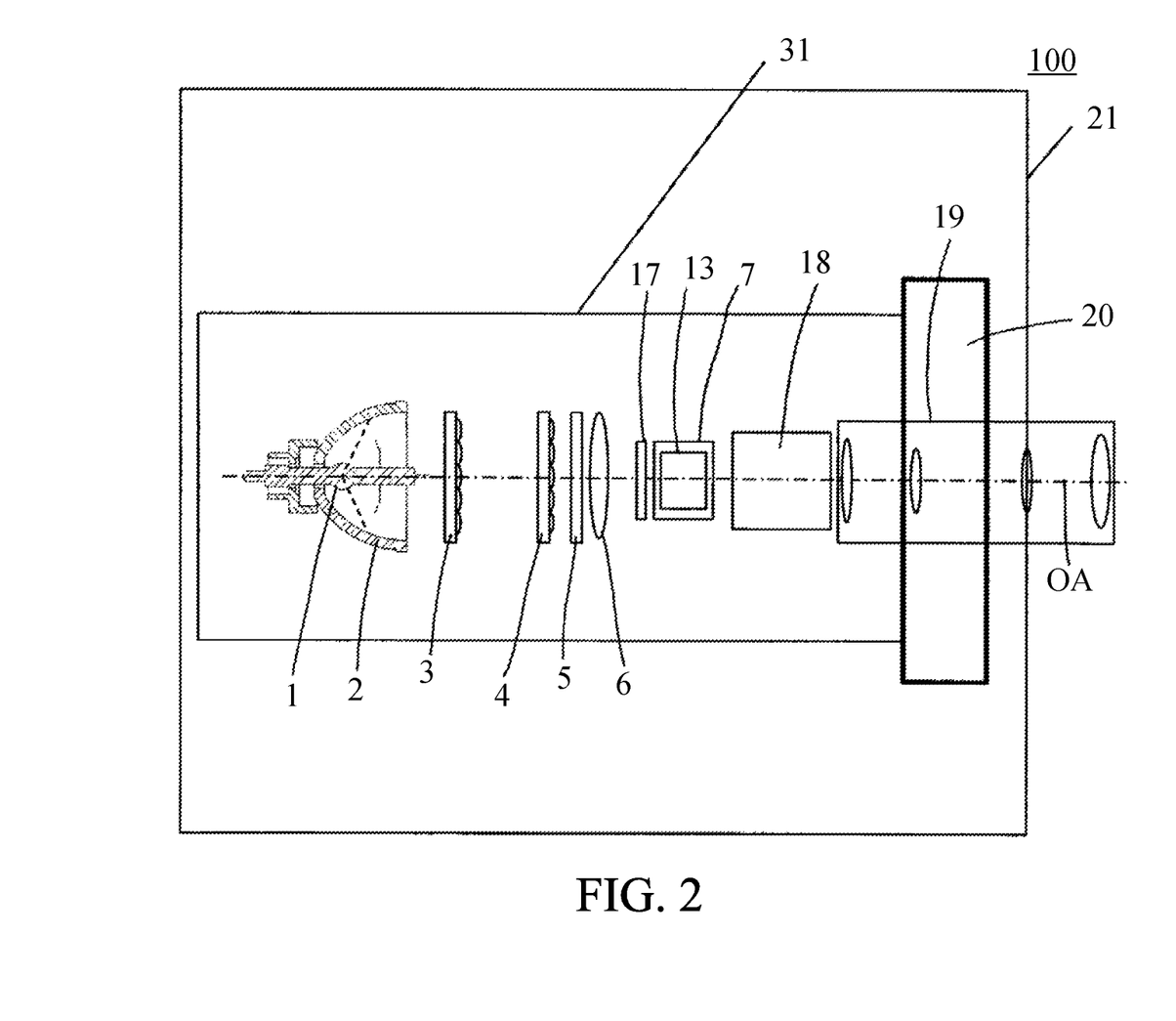
FIG. 2 is a top view of the projection type display apparatus according to each embodiment.

Referring now to FIGS. 1 and 2, a description will be given of a configuration of a projection type display apparatus (liquid crystal projector) according to the first embodiment of the present invention. FIG. 1 is a side view of the projection type display apparatus 100. FIG. 2 is a top view of the projection type display apparatus 100. Herein, a liquid crystal projector using a reflective liquid crystal panel as a light modulation element will be described, but the present invention is applicable to a projector apparatus using another light modulation element, such as a DMD (Digital Mirror Device), and a transmissive liquid crystal display element.

The light emitted from the light source unit enters a fly-eye lens 3. The light source unit, as used herein, means is a generic term for a combination of a light source (light source bulb, light source lamp) 1 and a mirror (parabolic mirror) 2 for reflecting the light from the light source 1. The light pupil-divided by the fly-eye lens 3 enters a fly-eye lens 4 and then a PS conversion element 5. The PS conversion element 5 converts randomly polarized light emitted from the light source unit to P-polarized light and emits it.

Next, the light condensed by a condenser lens 6 enters a color separation optical system. A dichroic mirror 7 decomposes the light from the condenser lens 6 into green light that linearly travels and other magenta light. The linearly traveling green light is converted into S-polarized light by a half waveplate 8, enters a polarization beam splitter ("PBS") 9, is reflected by the reflective surface, passes through a quarter waveplate 10, and then passes through a green panel 11 (reflective type liquid crystal panel for G light). The light modulated by the green panel 11 enters the quarter waveplate 10 again and then enters a color combining prism 18.

The magenta light (blue light and red light) enters a color select element 12. The color select element 12 converts the red light into the P-polarized light, for example, and enables the S-polarized blur light to enter a PBS 13 as it is. The S-polarized blue light is reflected by the reflective surface of the PBS 13. The P-polarized red light is transmitted through the reflective surface of the PBS 13.

Next, the blue light passes through a quarter wavelength plate 16 and then enters a blue panel (reflective liquid crystal panel for the B light) 17. The light modulated by the blue panel 17 enters the quarter waveplate 16 again and then enters a color combining prism 18. After passing through a quarter waveplate 14, the red light enters a red panel (reflective liquid crystal panel for the R light) 15. The light modulated by the red panel 15 again enters the quarter waveplate 14, is reflected by the PBS 13, and then enters the color combining prism 18. The color combining prism 18 combines the red light, the green light, and the blue light into white light. A projection lens 19 projects the white light combined by the color combining prism 18 onto an unillustrated projection surface such as a screen.

An optical engine (container) 31 includes the light source unit, the panels 11, 15, and 17, and an optical system (optical elements, such as the fly-eye lenses 3 and 4, the PS conversion element 5, the condenser lens 6, and the dichroic mirror 7) configured to illuminate the panels 11, 15, and 17. The projection lens 19 is supported by and fixed onto a lens shift mechanism 20. The lens shift mechanism 20 is connected to and integrated with the optical engine 31. The lens shift mechanism 20 holds the projection lens 19 movably within a plane having an optical axis OA as the normal direction. The position of the projected image is arbitrarily adjustable by moving the projection lens 19.

A housing (exterior portion) 21 of the projection type display apparatus 100 houses the optical engine 31. The optical engine 31 is, for example, disposed substantially at the center of the container 21 (center layout configuration). The center layout configuration is employed for the following reasons. When the projection type display apparatus 100 is installed toward the screen, for example, it is installed on the ceiling using a ceiling hanger. At this time, if the center of the screen, the center of the ceiling hanger, and the center of the projection lens 19 coincide with one another, an adjustment amount of the image position by the lens shift mechanism 20 can be minimized. The light can pass near the optical axis OA in the projection lens 19 and the aberration of the projection lens 19 can be minimized by reducing the shift adjustment amount from the reference position in order to keep high the quality of the projected image.

On the other hand, the center layout configuration may negatively affect the image quality due to the image vibration in the installation environment of the projection type display apparatus 100. For example, it is conceivable that the resonance occurs due to the vibrations by a cooling fan installed inside the projection type display apparatus 100, or the resonance phenomenon occurs due to the vibrations caused by the motion specification and transmitted from an external device to a projection type display apparatus.

A description will now be given of a simulation result on the resonance mode generated when the vibration caused by the rotation of the cooling fan or the vibration based on the motion specification is input to the projection type display apparatus 100.

Figure 3:
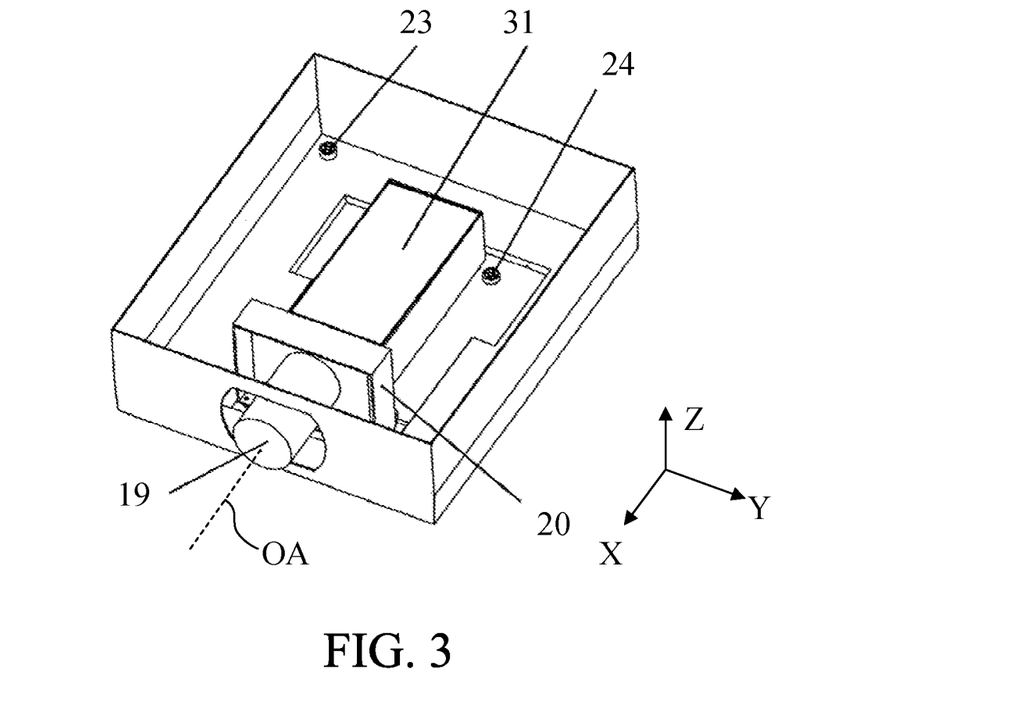
FIG. 3 is a perspective view of the projection type display apparatus according to a first embodiment.
Figure 4:
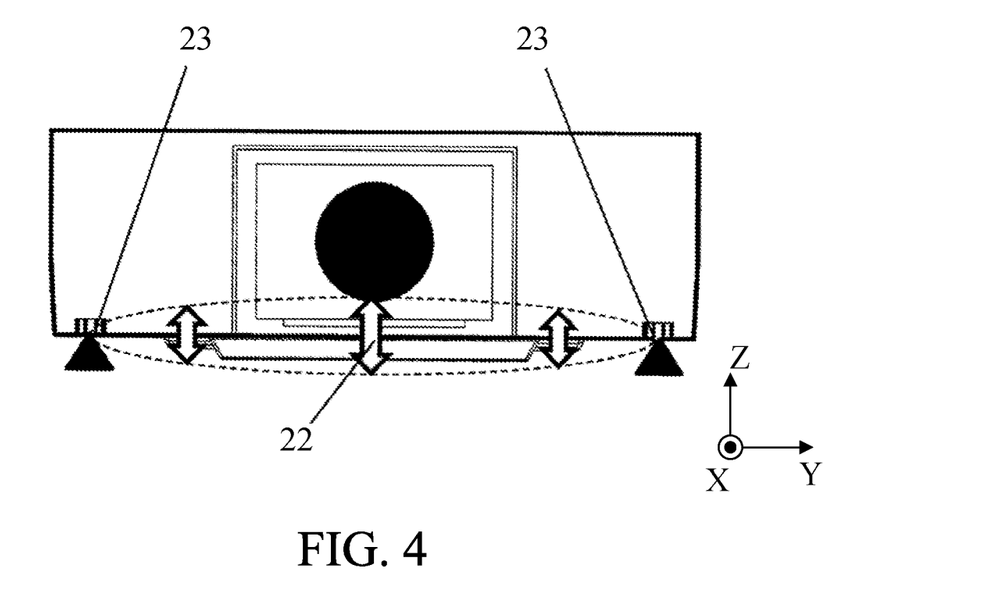
FIG. 4 is a front view of the projection type display apparatus according to the first embodiment.

FIG. 3 is a perspective view of the projection type display apparatus 100. FIG. 4 is a front view of the projection type display apparatus 100. FIG. 3 illustrates the optical engine 31 held at the center of the housing 21 in the projection type display apparatus 100 while a bottom surface of the optical engine 31 screwed on a lower portion of the housing 21. As illustrated in FIG. 3, a direction parallel to the direction along the optical axis OA (optical axis direction) in the projection lens 19 is defined as an X direction, a direction perpendicular to the X direction and parallel to the lateral direction of the housing 21 is defined as a Y direction, and a direction perpendicular to the X direction and parallel to the height direction of the housing 21 is defined as the Z direction.

The projection type display apparatus 100 includes installation portions (installation fixing portions) 23 and 24. The projection type display apparatus 100 is installed at a predetermined position via the installation portions 23 and 24. As a result of the vibration mode analysis, the first resonance occurs at around several tens Hz. In this vibration mode, as illustrated by an arrow 22 in FIG. 4, the vicinity of the center of the housing 21 (or the portion where the optical engine 31 is held) most significantly vibrates in the vertical direction (housing amplitude during the vibration). This vertical vibration vertically vibrates the optical engine 31 and the projection screen.

Due to the frequencies at several tens Hz, the blurs of the projected image may be visually recognized. In order to avoid this resonance phenomenon, it is effective to make more rigid the housing 21 by increasing the thickness of the housing 21. Then, the entire projection type display apparatus 100 can become heavier, the acceleration during vibration increases, and the resonance influence increases rather. For this reason, the resonance frequency may be changed by connecting and fixing the internal components such as the optical engine 31 with the housing 21 using a small number of reinforcement members. More specifically, it is necessary to increase the frequency up to about several hundred Hz at which the projected image cannot be visually recognized.

Figure 5A:
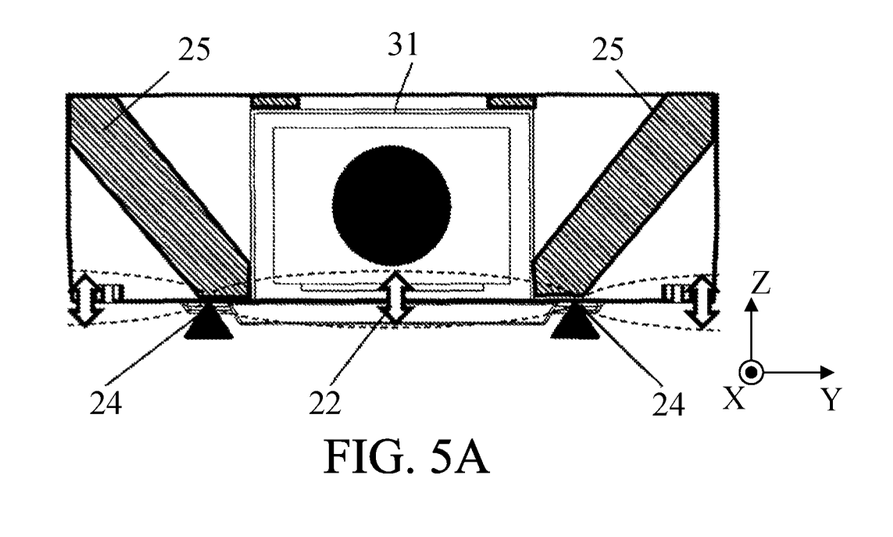
FIGS. 5A and 5B are configuration diagrams of the projection type display apparatus according to the first embodiment.
Figure 5B:
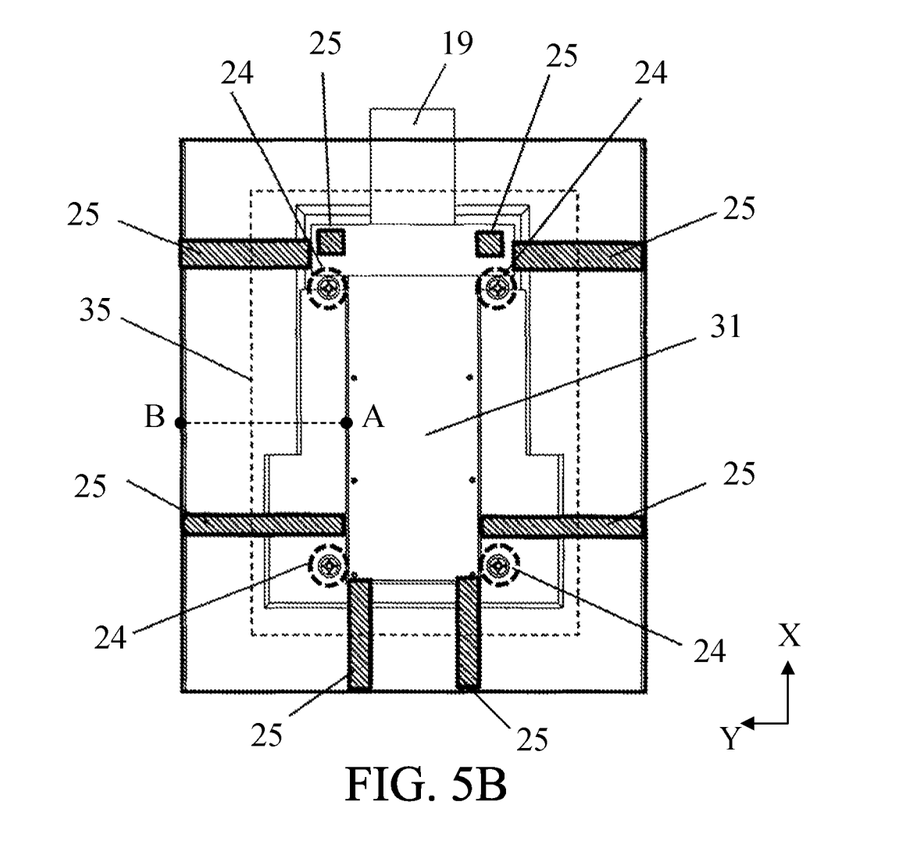

Referring now to FIGS. 5A and 5B, a description will be given of the configuration that provides the best result in a shape optimization calculation (finite analysis method based on a density method) for maximizing the primary resonance frequency while the optical engine 31 is attached to (housed in) the housing 21. FIGS. 5A and 5B are configuration diagrams of the projection type display apparatus 100 determined by shape optimization calculation. FIG. 5A is a front view of the projection type display apparatus 100, and FIG. 5B is a top view of the projection type display apparatus 100, each showing the result determined by shape optimization calculation. The result shows that the reinforced portion can be made smaller with small resonance influence by reinforcing the housing with the reinforcement member and by disposing the installation portion 23 of the housing 21 near the optical engine 31.

The projection type display apparatus 100 according to this embodiment includes a plurality of connecting portions 25 that connect the outer surface of the optical engine 31 to the inner surface of the housing 21. The connecting portion 25 is the reinforcement member (fixing member) configured to reinforce the projection type display apparatus 100. The connecting portion 25 extends in each of the X direction and the Y direction from the optical engine 31 toward the housing 21 (from the lower side of the outer surface of the optical engine 31 to the upper side of the inner surface of the housing 21). One of the extending connecting portions 25 is fixed onto the outer surface of the optical engine 31, and the other of the extending connecting portions 25 is fixed onto the inner surface of the housing 21. The fixing method may use screwing, adhesion, welding, melting and the like.

The side of the connecting portion 25 contacting the inner surface of the housing 21 needs to be fixed onto the side surface of the housing 21 or the upper surface or lower surface of the housing 21. In other words, part of the plurality of connecting portions 25 is fixed onto at least the side surface of the housing 21, and another part of the plurality of connecting portions 25 needs to be fixed onto at least the upper surface of the housing 21. Thereby, the housing can be reinforced, and the resonance influence can be reduced. As illustrated in FIGS. 5A and 5B, one connecting portion 25 may be provided so as to be fixed onto the upper surface and the side surface of the housing 21. The plurality of the thus provided connecting portions 25 can further reinforce the housing, and reduce the resonance influence. In this embodiment, the inner surface located on the upper side in the gravity direction will be referred to as an upper surface when the projection type display apparatus 100 is disposed as illustrated in FIG. 5A. The inner surface located on the lower side in the gravity direction will be referred to as a lower surface when the projection type display apparatus 100 is disposed as illustrated in FIG. 5A. The side surface of the housing 21 means another inner surface.

Figure 12A:
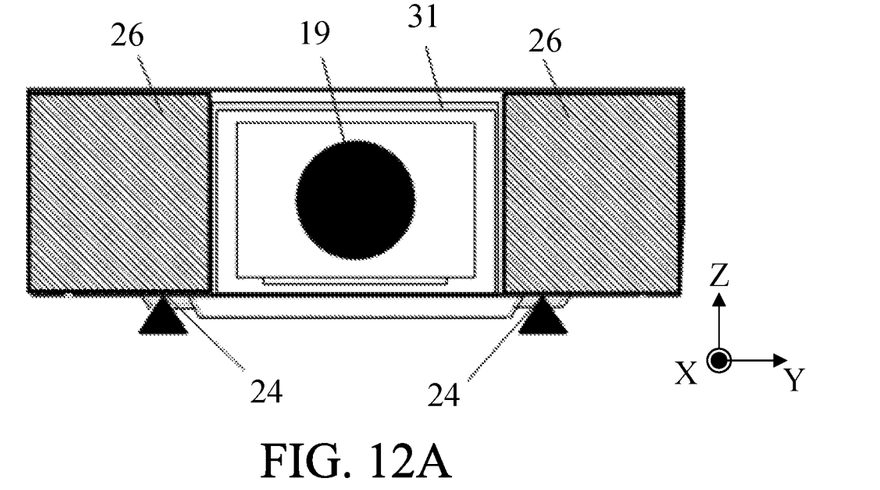
FIGS. 12A and 12B are configuration diagrams of the projection type display apparatus according to the first embodiment.
Figure 12B:
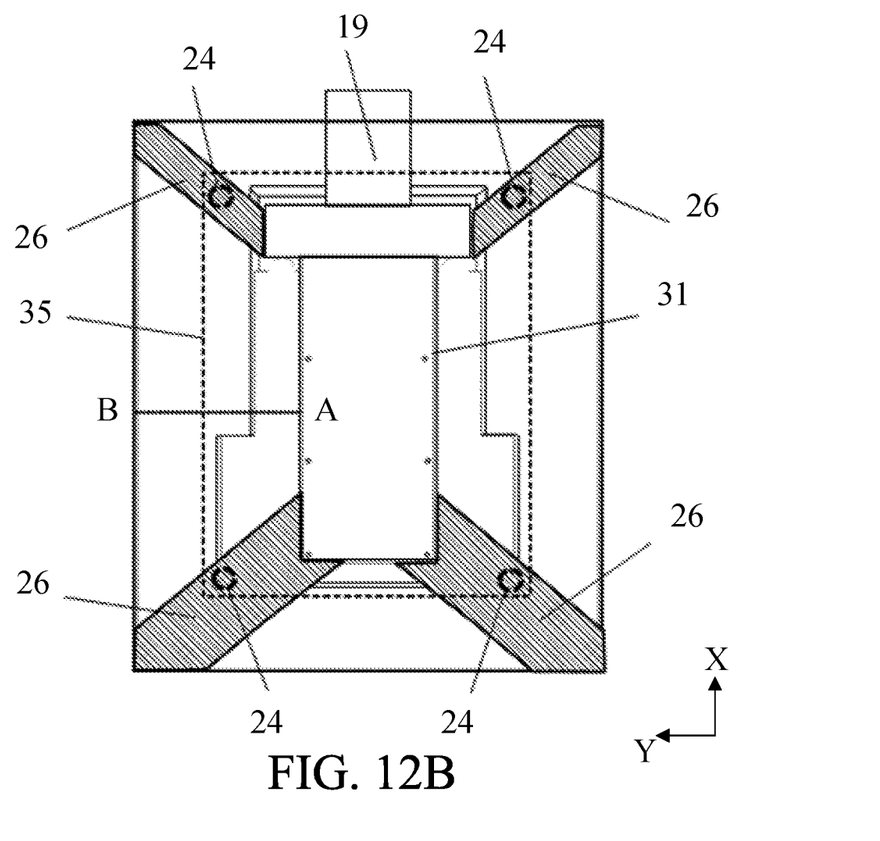

Referring now to FIGS. 12A and 12B, a description will be given of an example that uses the structure of the connecting portion 26 different from the connecting portion 25 in FIGS. 5A and 5B. FIG. 12A is a front view of the projection type display apparatus 100, and FIG. 12B is a top view of the projection type display apparatus 100. As illustrated in FIG. 12B, a connecting portion (reinforcement member) 26 radially extends from the optical engine 31 on the XY plane. As illustrated in FIG. 12A, the connecting portion 26 has a plate shape (planar shape) in the Z direction. Similar to the example of FIGS. 5A and 5B, due to the structure of the connecting portion 26, the side of the connecting portion 26 contacting the inner surface of the housing 21 is fixed onto the side surface of the housing 21 or the upper or lower surface of the housing 21, reinforce the housing, and reduce the resonance influence.

It is known that the vibration (amplitude) at the center of the housing 21 increases as the installation portion 24 of the housing 21 moves away from the center of the housing 21. Accordingly, as illustrated in FIGS. 5A, 5B, 12A, and 12B, the installation portion 24 may be disposed near the center of the housing 21 as close as possible. This is because the reinforcement member configured to suppress the amplitude can become larger.

Figure 6A:
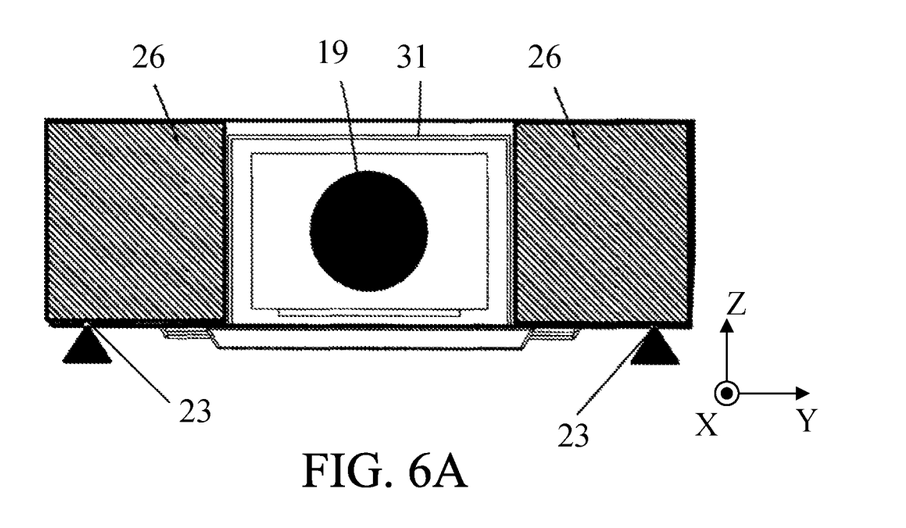
FIGS. 6A and 6B are configuration diagrams of the projection type display apparatus according to the first embodiment.
Figure 6B:
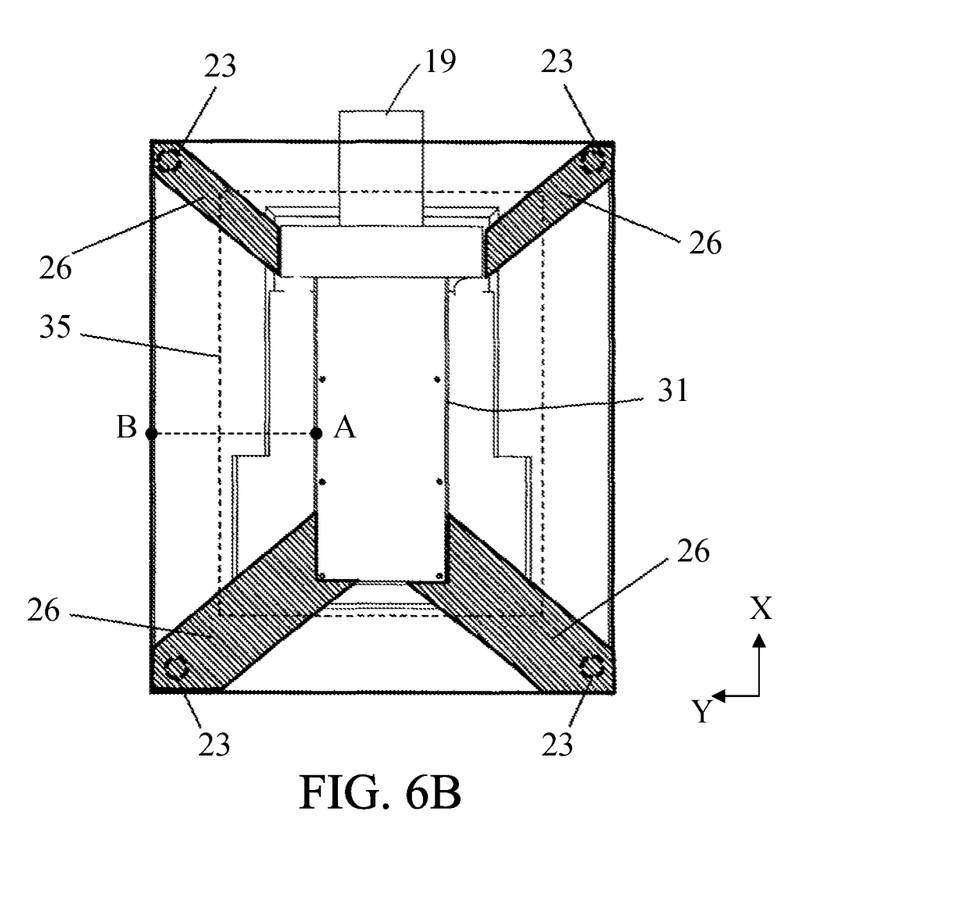

Referring now to FIGS. 6A and 6B, a description will be given of an optimal example for preventing the reinforcement member from being larger even when the installation portion is disposed near the outer circumference of the housing 21. FIGS. 6A and 6B illustrate an example that provides the best result in the shape optimization calculation when the installation portion 23 is disposed near the outer circumference of the housing 21. FIGS. 6A and 6B illustrate the projection type display apparatus 100 having the installation portion 23 in which the installation portion 24 near the center of the housing 21 in the projection type display apparatus 100 in FIGS. 12A and 12B is moved to the outer circumference. FIG. 6A is a front view of the projection type display apparatus 100, and FIG. 6B is a top view of the projection type display apparatus 100.

As illustrated in FIG. 6B, the connecting portion (reinforcement member) 26 radially extends from the optical engine 31 on the XY plane. As illustrated in FIG. 6A, the connecting portion 26 has a plate shape (planar shape) in the Z direction. Since the connecting portion 26 of FIGS. 6A and 6B has a larger volume than that of the connecting portion 25 in FIGS. 5A and 5B, the connecting portion 26 becomes heavier. However, the connecting portion illustrated in FIGS. 6A and 6B can reduce the resonance influence as even when it is located near the outer circumference.

A similar shape optimization calculation was performed by changing the distance from the optical engine 31 to the installation unit 23. As a result, when the installation portion 23 is disposed from the optical engine 31 within 50% of the distance from the optical engine 31 to the housing section 21 (when the installation portion 24 is disposed in a region inside a dotted line 35 in FIGS. 5B and 6B), the vibration could be effectively suppressed. Thus, this embodiment may dispose the installation portion 24 closer to an end (A) of the optical engine 31 than the outer edge (B) of the housing 21. In other words, the distance from the installation portion 24 to the end (A) of the optical engine 31 is 50% or less of the distance from the end (A) of the optical engine 31 to the outer edge (B) of the housing 21. The connecting portion 25 can be made lightweight by disposing the installation portion 24 in this region and by extending the connecting portion 25 in each of the X and Y directions.

This embodiment uses the connecting portions 25 and 26 to connect the walls of the optical engine 31 and the housing 21 to each other. This configuration can reduce the size and weight of the connecting portion (reinforcement member) and improve the resonance frequency at several hundred Hz, which is a level at which the resonance frequency cannot be visually recognized in a projected image.

Second Embodiment

Figure 7:
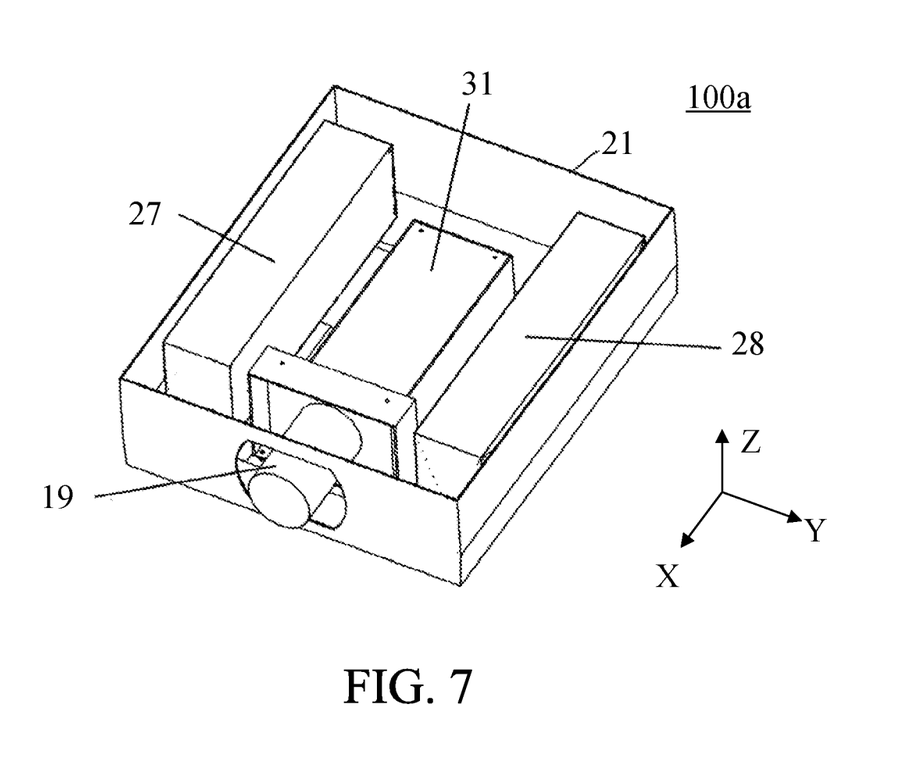
FIG. 7 is a perspective view of a projection type display apparatus according to a second embodiment.
Figure 8A:
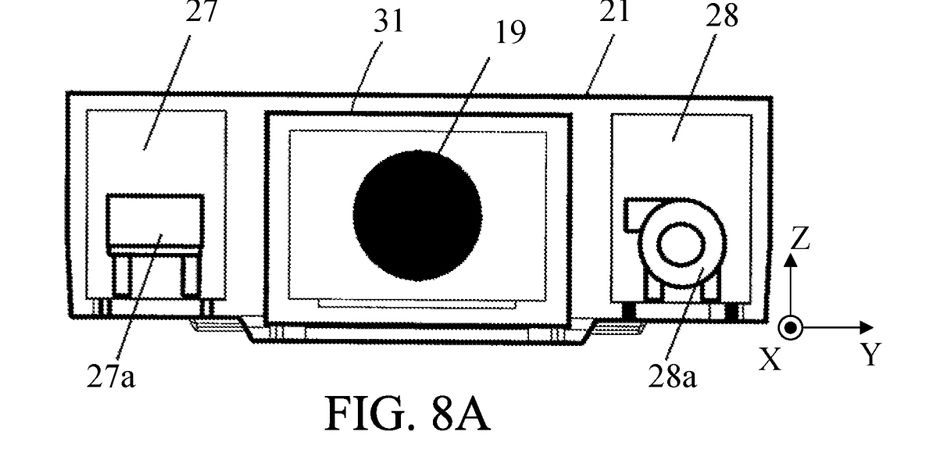
FIGS. 8A and 8B are configuration diagrams of the projection type display apparatus according to the second embodiment.
Figure 8B:
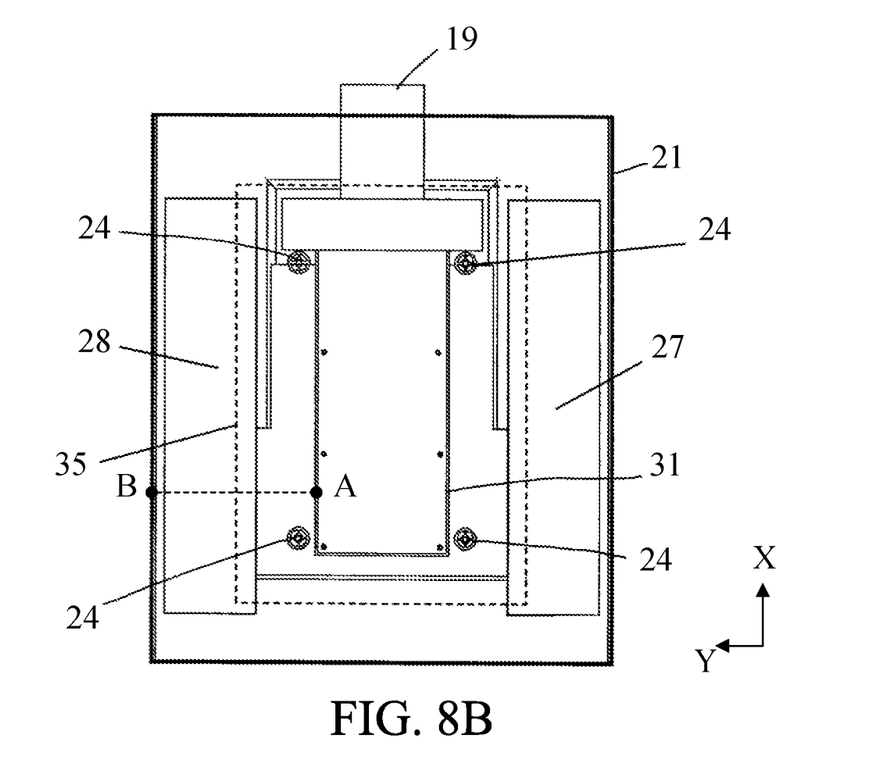
Figure 9:
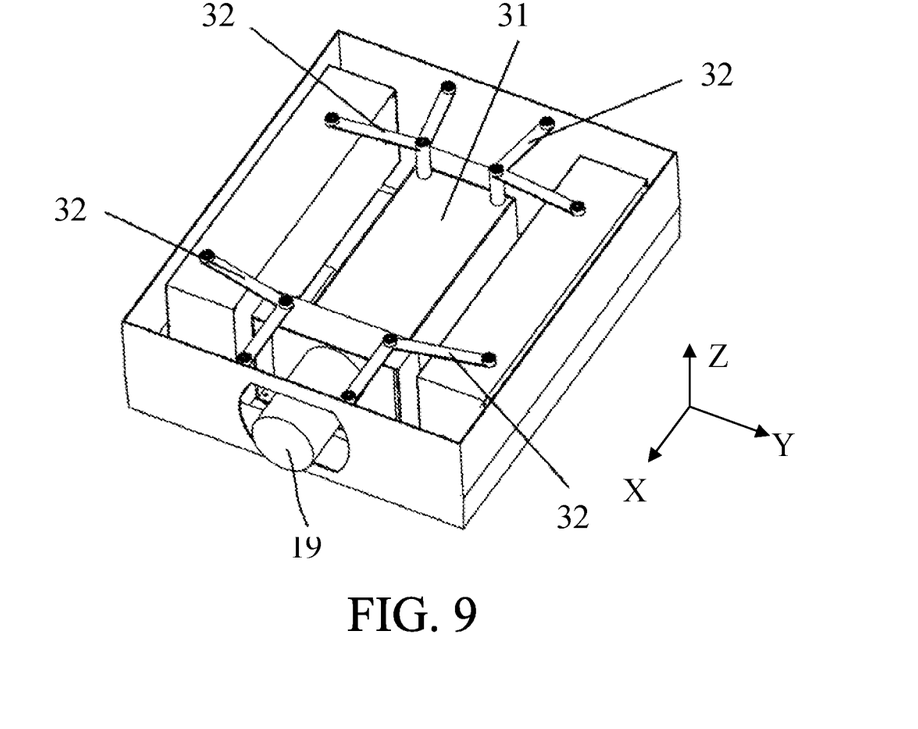
FIG. 9 is a perspective view of the projection type display apparatus according to the second embodiment.
Figure 10:
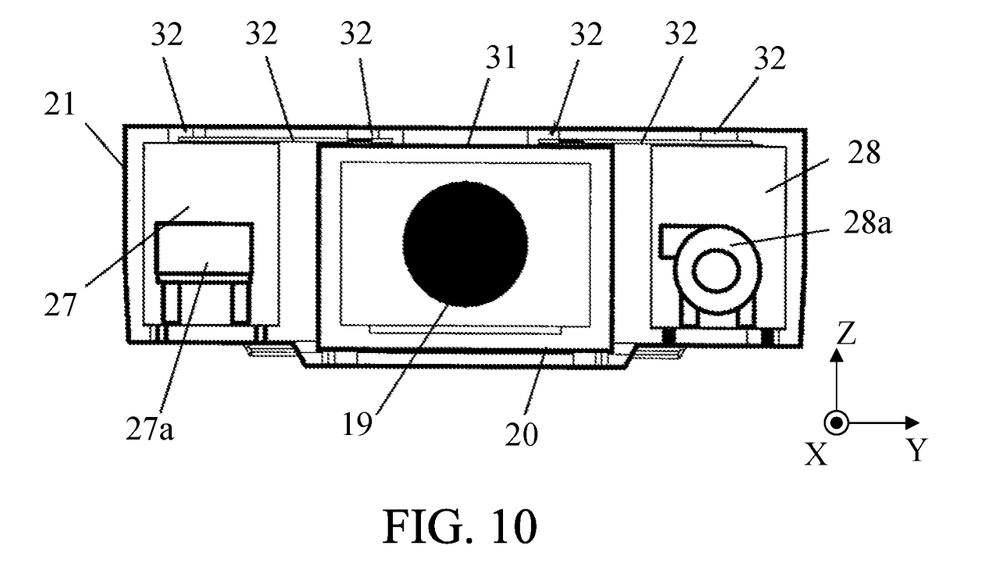
FIG. 10 is a front view of the projection type display apparatus according to the second embodiment.

Referring now to FIGS. 7 to 10, a description will be given of a projection type display apparatus (liquid crystal projector) according to a second embodiment of the present invention. FIG. 7 is a perspective view of a projection type display apparatus 100a. FIGS. 8A and 8B are configuration diagrams of the projection type display apparatus 100a, where FIG. 8A is a front view and FIG. 8B is a plan view. FIG. 9 is a perspective view of the projection type display apparatus 100a including a connecting portion 32. FIG. 10 is a front view of the projection type display apparatus 100a including the connecting portion 32. While this embodiment will discuss a liquid crystal projector using a reflective liquid crystal panel as a light modulation element, the present invention is applicable to another light modulation elements such as a DMD (Digital Mirror Device) and a projector apparatus using a transmissive liquid crystal display element.

As a unit other than the optical engine 31, the projection type display apparatus 100a includes an electrical unit 27 that includes a main substrate 27a configured to control the overall operation of the projection type display apparatus 100a and a liquid crystal drive substrate, a cooling unit 28 that includes a cooling device 28a and a light-source driving power-supply substrate. The electrical unit 27 and the cooling unit 28 are disposed on the side of the optical engine 31 so as to sandwich the optical engine 31, respectively, and are fixed onto the lower portion of the housing 21 in FIGS. 8A and 8B by screws or the like. This configuration may have difficulties in separately providing a large connecting portion (reinforcement member) unlike the first embodiment. Accordingly, this embodiment may use parts of each of the electrical unit 27 and the cooling unit 28 to serve as a reinforcement member.

As illustrated in FIG. 10, the optical engine 31, the electrical unit 27, and the cooling unit 28 are screwed onto the lower part of the container 21, respectively. As illustrated in FIG. 9, the connecting portion 32 is connected to the upper portion of the housing 21 so as to extend from the optical engine 31 to the electrical unit 27 and the cooling unit 28 by screws or the like. The connecting portion 32 is connected to the side surface and the upper surface of the housing 21 so as to extend in each of the X direction, the Y direction, and the Z direction. In other words, the side of the plurality of connecting portions 32 fixing the optical engine 21 onto the housing 21 is fixed onto the inner surface of the housing 21 directly or via units other than the optical engine 31 such as the electrical unit 27 and the cooling unit 28. At least part of the connecting portion 32 fixed onto the inner surface of the housing 21 among the plurality of connecting portions 32 may be fixed onto the side surface of the housing.

Even when the vibration is transmitted to the optical engine 31 via the connecting portion between the housing 21 and the optical engine 31, this configuration can avoid image fluctuations caused by the resonance at an affected frequency and thus can provide a high image quality projection type display apparatus. The simulation result shows the effect of increasing the resonance frequency by about 50% as compared with the configuration without the connecting portion 32.

Figure 11A:
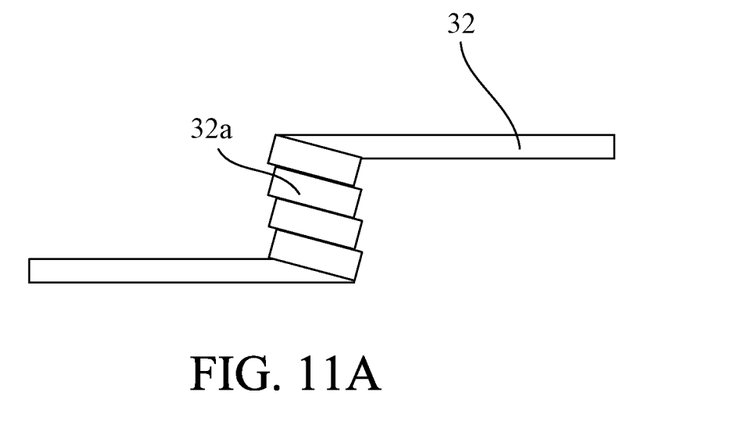
FIGS. 11A and 11B illustrate modified connecting portion according to the second embodiment.
Figure 11B:
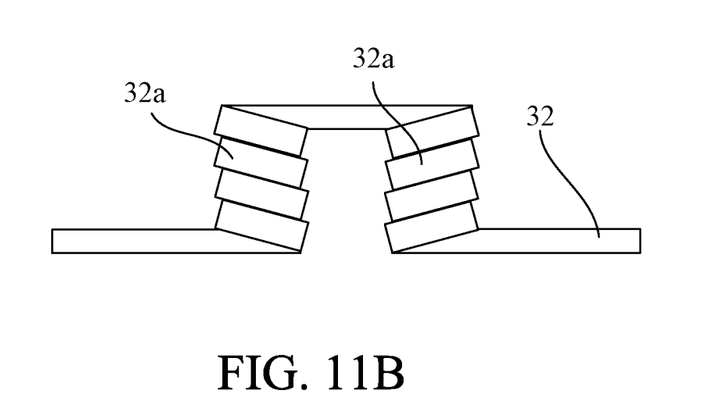

Referring now to FIGS. 11A and 11B, a description will be given of a modification of the connecting portion 32 in this embodiment. FIGS. 11A and 11B are modifications of the connecting portion 32. In this embodiment, as in the respective modifications illustrated in FIGS. 11A and 11B, part of the connecting portion 32 may have an elastic structure (spring structure) 32a. The elastic structure 32a acts as a rigid body in normal use and acts as a flexible body that relaxes the stress in a drop impact.

Third Embodiment

Figure 13:
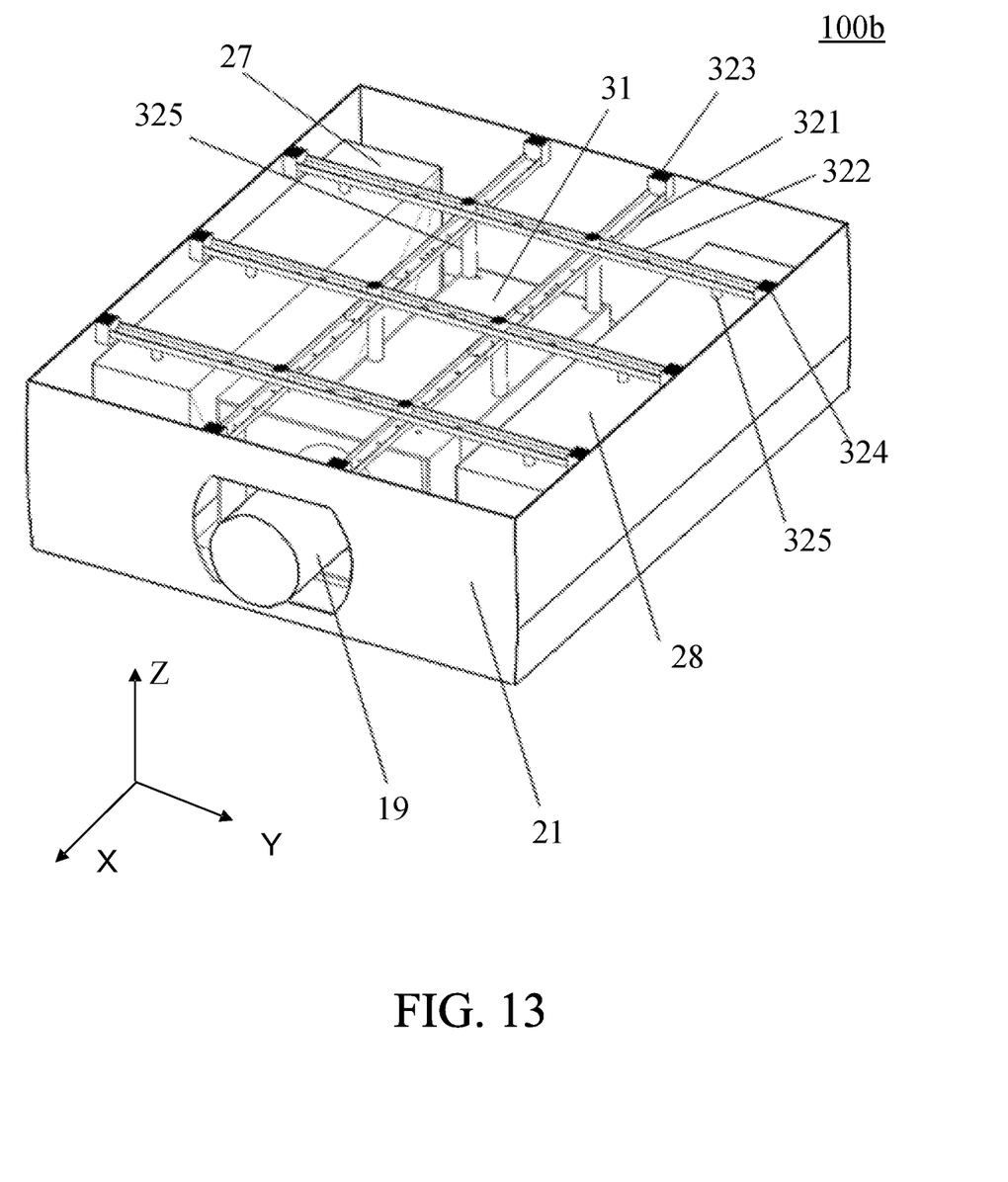
FIG. 13 is a perspective view of a projection type display apparatus according to a third embodiment.
Figure 14:
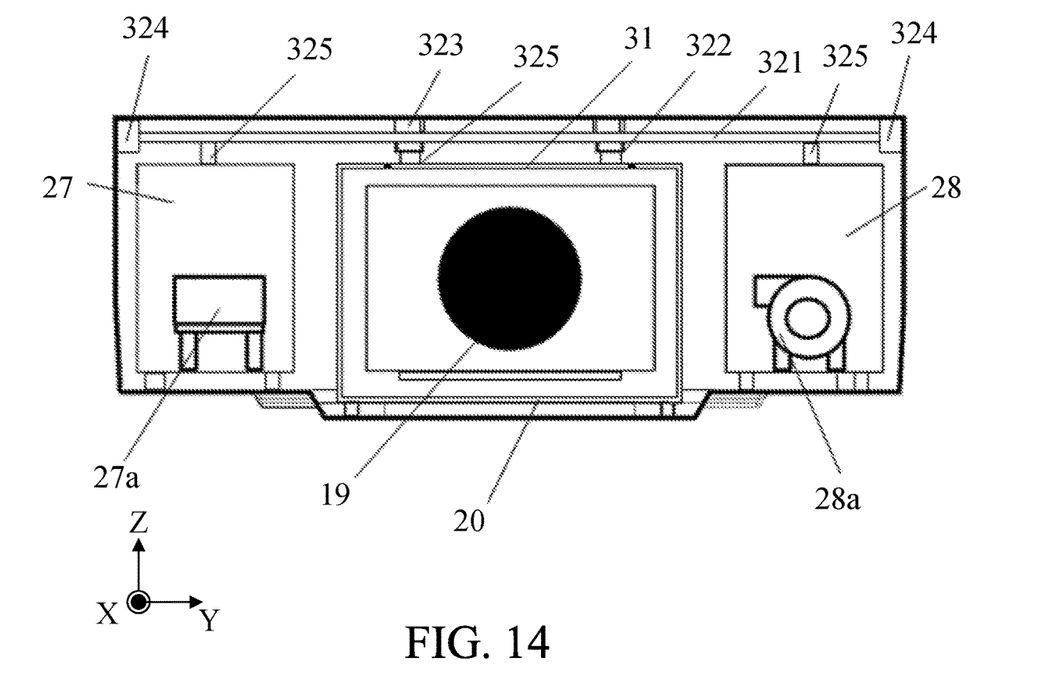
FIG. 14 is a front view of the projection type display apparatus according to the third embodiment.

Referring now to FIGS. 13 and 14, a description will be given of a projection type display apparatus (liquid crystal projector) according to a third embodiment of the present invention. This embodiment is a modification of the second embodiment. FIG. 13 is a perspective view of the projection type display apparatus 100b. FIG. 14 is a front view of the projection type display apparatus 100b. This embodiment will omit the same description as that in the second embodiment. While this embodiment will discuss a liquid crystal projector using a reflective liquid crystal panel as a light modulation element, the present invention is applicable to a projector apparatus using other light modulation elements such as a DMD (Digital Mirror Device) and a transmissive liquid crystal display element.

A plurality of connecting portions (reinforcement members) 321 extending in the X direction of the projection type display apparatus are fixed by screws or the like onto the upper surface and the side surface of the housing 21 by a fixing portion 323. A plurality of connecting portions (reinforcement members) 322 extending in the Y direction of the projection type display apparatus are fixed onto the upper surface and the side surface of the housing 21 by screws or the like by a fixing portion 324. The optical engine 31, the electrical unit 27, and the cooling unit 28 are connected to one of the upper surface of the housing 21 and either the connecting portion 321 or 322 by a connecting portion (reinforcement member) 325 extending in the Z direction. At this time, the strength can be improved through connections to both the connecting portions 321 and 322. This structure does not need to increase the thickness of the housing to increase the rigidity. Therefore, a high quality projection can be realized which can maintain the rigidity, make light the entire product, reduce the resonance influence and the vibrational influence as much as possible.

In order to connect the connecting portions 321 and 322 to the side surface of the housing 21, this embodiment connects all of the fixing portions 323 and 324 on the side surface and the upper surface of the housing 21, but the present invention is not limited to this embodiment. For example, even when part of the fixing portions 323 and 324 does not contact the side surface of the housing 21, substantially the same effect can be obtained as long as it is provided near the side surface end. However, in that case, at a ridgeline portion where the side surface and the upper surface or the lower surface of the container 21 are combined with each other, it is necessary to increase the strength by increasing the partial exterior thickness or the like for part where the connecting part is originally disposed.

This embodiment shows an example in which the connecting portions 321 and 322 are disposed on the upper surface of the housing 21, but the embodiment is not limited to this embodiment. Even when the connecting portions 321 and 322 are arranged near the optical axis of the projection lens, the similar effect can be obtained even if it is arranged in the lower part of the housing.

Thus, according to each of the embodiments, the projection type display apparatus 100 (100a, 100b) includes the container (the optical engine 31), the housing 21, the reinforcement member (the connecting portions 25, 26, 32, 321, 325). The container can house a light source unit, a light modulation unit (liquid crystal panel: the green panel 11, the red panel 15, the blue panel 17), an optical system (fly-eye lenses 3 and 4, the PS conversion element 5, the condenser lens 6, etc.) for illuminating the light modulation element with the light from the light source unit). The housing houses the container. The reinforcement member extends from the outer surface (such as the top surface) of the container to the inner surface (such as at least one of the top surface and the side surface) of the housing, and contacts the outer surface of the container and the inner surface of the housing. The side of the reinforcement member contacting the inner surface of the housing is fixed onto the side surface of the housing.

A plurality of reinforcement members may be provided, and the side of at least part of each of the plurality of reinforcement members fixed to the housing may be fixed onto the side surface of the housing. The reinforcement member extends in at least one of the X direction, the Y direction, and the Z direction from the container to the housing. The projection type display apparatus may include a unit (electrical unit 27, cooling unit 28) housed in the housing. The unit, the container, and the housing are connected by the reinforcement member.

In each embodiment, the reinforcement member (connecting portion 32) may be made of one metal plate (flat plate). In each embodiment, the installation portion 24 is not limited to the leg portion provided in the housing 21, and may be a screw hole formed in the housing 21. In each embodiment, the light source unit includes a lamp as a light source, but the present invention is not limited to this embodiment. The light source unit may have a light source that emits white light using a laser and fluorescent substance, for example.

The light source unit may be removable from the projector to replace it with a new one. In other words, the container may be any as long as it can house the light source unit, the liquid crystal panel, and the optical system for illuminating the liquid crystal panel.

Thus, when the projection type display apparatus is mounted on a simulator device and operated, each embodiment can prevent the resonance caused by the self-excited vibration and the disturbance vibration caused by the environment of the installation location from affecting the image quality. Hence, each embodiment can provide a compact and lightweight projection type display apparatus which can project high quality images.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2018-84874, filed on Apr. 26, 2018 and 2019-56558, filed on Mar. 25, 2019 which are hereby incorporated by reference herein in their entirety.

What is claimed is:

1. A projection type display apparatus comprising:
a container configured to house a light source unit, a light modulation element, and an optical system configured to illuminate the light modulation element with light from the light source unit;
a housing configured to house the container; and
a reinforcement member configured to extend from an outer surface of the container to an inner surface of the housing and to contact the outer surface of the container and the inner surface of the housing,
wherein a side of the reinforcement member contacting the inner surface of the housing is fixed onto a side surface of the housing.

2. The projection type display apparatus according to claim 1, wherein the projection type display apparatus comprises a plurality of reinforcement members, and the side fixed onto the housing of each of the plurality of reinforcement members is fixed onto the side surface of the housing.

3. The projection type display apparatus according to claim 1, wherein the reinforcement member extends in at least one of an X direction, a Y direction, and a Z direction from the container toward the housing where the X direction is a direction parallel to an optical axis direction in a projection lens, the Y direction is a direction perpendicular to the X direction and parallel to a lateral direction of the housing, and the Z direction is a direction perpendicular to the X direction and parallel to a height direction of the housing.

4. The projection type display apparatus according to claim 1, further comprising an installation portion provided in the housing so as to install the projection type display apparatus, and disposed closer to an end of the container than an outer edge of the housing.

5. The projection type display apparatus according to claim 4, wherein the installation portion includes a leg portion provided to the housing.

6. The projection type display apparatus according to claim 4, wherein the installation portion has a screw hole formed in the housing.

7. The projection type display apparatus according to claim 1, further comprising a unit housed in the housing, wherein the unit and the container are fixed onto the housing by the reinforcement member.

8. The projection type display apparatus according to claim 1, wherein the reinforcement member is made of a single metal plate.

9. The projection type display apparatus according to claim 1, wherein at least part of the reinforcement member has an elastic structure.

10. The projection type display apparatus according to claim 1, wherein the light source unit includes a lamp.

11. The projection type display apparatus according to claim 1, wherein the light source unit includes a laser and fluorescence substance.

* * * * *